(Model.)
G. D. ROWELL.
HORSE HAY FORK.
No. 263,967. Patented Sept. 5, 1882.
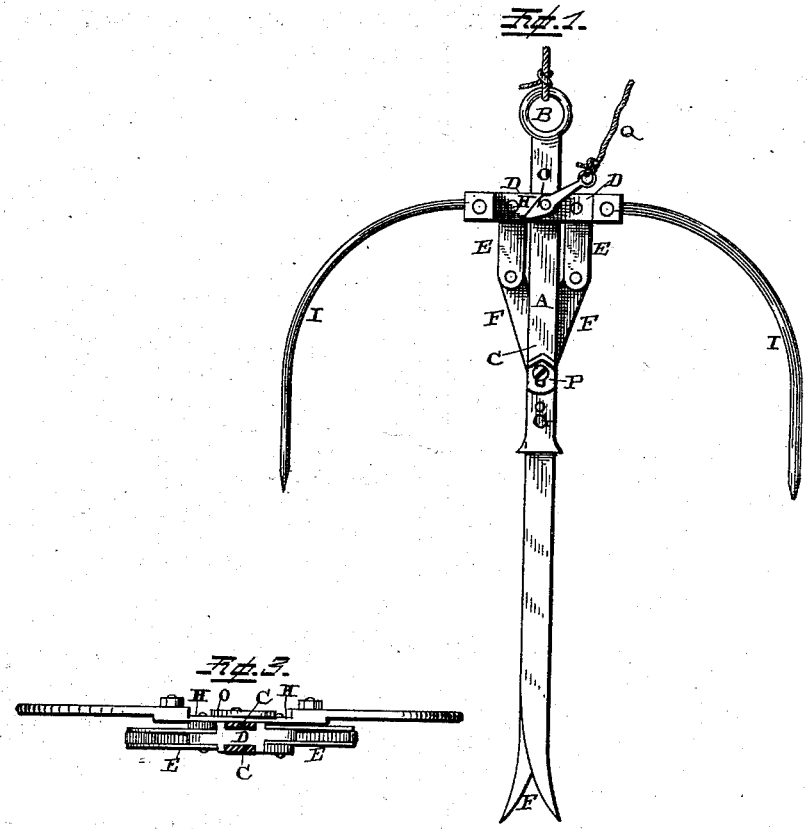
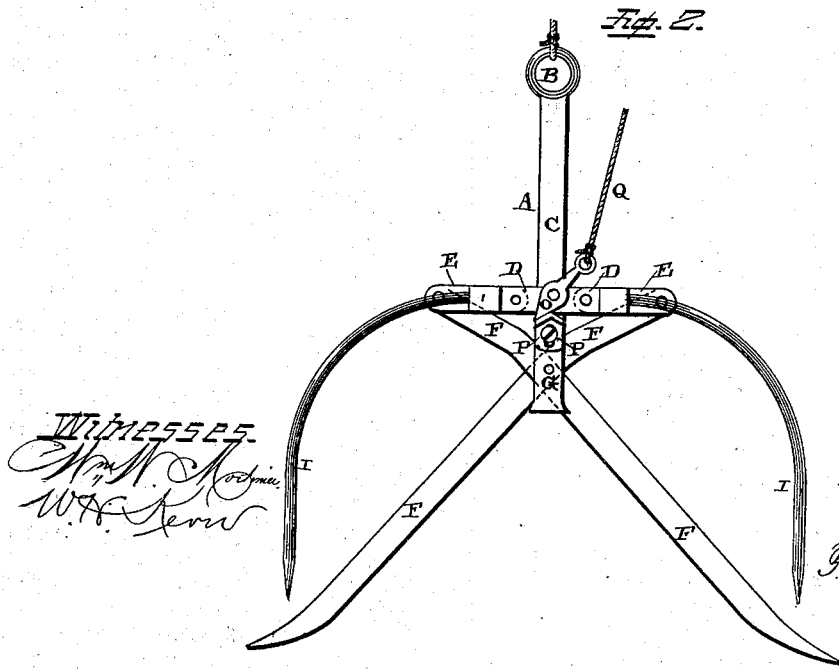
Witnesses:
Inventor
G. D. Rowell,
per F. A. Lehmann,
Att'y.

UNITED STATES PATENT OFFICE.

GUILFORD D. ROWELL, OF APPLETON, WISCONSIN, ASSIGNOR TO THE APPLETON MANUFACTURING COMPANY, OF SAME PLACE.

HORSE HAY-FORK.

SPECIFICATION forming part of Letters Patent No. 263,967, dated September 5, 1882.

Application filed April 24, 1882. (Model.)

*To all whom it may concern:*

Be it known that I, G. D. ROWELL, of Appleton, in the county of Outagamie and State of Wisconsin, have invented certain new and useful Improvements in Horse Hay-Forks; and I do hereby declare the following to be a full, clear, and exact description of the invention, such as will enable others skilled in the art to which it pertains to make and use it, reference being had to the accompanying drawings, which form part of this specification.

My invention relates to an improvement in horse hay-forks; and it consists, first, in the combination of the vertically-slotted body with the tines, which are pivoted in the body near its lower end, and which are connected at their upper ends by means of plates or rods with a slide which moves back and forth within the slot in the body, which slide has secured to it a horizontal arm carrying the latch or lever for unlocking the tines; second, in the combination of the body, the pivoted tines, the slide having secured to it a latch, and a slotted adjustable device which is secured to the body, and which automatically operates the latch, as will be more fully described hereinafter.

The object of my invention is to produce a light, cheap, and a simple hay-fork which is especially adapted for raising straw, barley, or short and loose hay, and which is provided with adjustable unlocking devices which hold the tines in an outstretched position while raising a load of hay or straw.

Figure 1 is a side elevation of my invention, showing the fork closed. Fig. 2 is a similar view, showing the fork open. Fig. 3 is a horizontal cross-section of my invention.

A represents the body of the fork, which is provided with the ring B at its upper end, in which the elevating-rope is made to catch in the usual manner. The lower portion of this body consists simply of two plates, C, which are separated sufficiently far from each other to form a slot in which the slide D moves back and forth. Secured to each of the ends of this vertically-moving slide are the links E, which have secured to their outer ends the upper ends of the tines F, which are pivoted at G in the lower part of the body. When the tines are opened outward, as shown in Fig. 2, the slide is drawn downward; but when the fork is closed, as shown in Fig. 1, the slide is moved upward between the two plates C, as shown in Fig. 1. Secured to this slide is the horizontal arm H, which moves vertically with the slide upon the outside of the frame A, and which has secured to each of its ends the curved tines I, which can be readily removed when so desired. These tines will be used where short and loose hay, barley, and straw are to be moved, but need not be used where hay is being raised into the barn from a wagon or any place where the hay is packed solidly enough to hold together. This horizontal arm has the short pointed latch O pivoted upon it, and which latch, as the slide moves downward, comes in contact with the upper edge of the device P, which is secured to the side of the frame A. The upper end of this device is made sharp-pointed, as shown, so that no matter in what position the latch is the tines will lock equally as well. When the slide is in its lower position the latch has its lower end resting against the top of this device, as shown in Fig. 2. While the latch is held in this position the slide cannot be moved upward by any weight that is applied to the tines until the trip-rope Q, which is attached to the upper end of the latch, is given a pull. When the rope is pulled the latch is turned upon its pivot in such a manner as to form a lever, which, by bearing against the beveled top of the device, forces the slide upward, so that the weight of the hay or straw upon the tines will cause them to close, and thus allow the hay or straw to drop off. This device is made slotted, so that it can be adjusted directly upon the body, and thus make the latch hard or easy to operate by regulating the distance the slide shall move downward. The farther the slide is allowed to move downward the farther the slide is from the inside of the upper ends of the tines, and hence the greater effort to overcome the weight of the hay or straw which presses the slide downward. The higher the device is raised the more it prevents the slide from dropping below the level of or an imaginary horizontal line passing through the upper ends of the tines, and hence the weight of the hay or straw will exert a less downward pressure upon the slide.

Having thus described my invention, I claim—

1. In a horse hay-fork, the combination of the body A, having a slot made through its lower portion, the slide, the connecting-links, the pivoted tines, the horizontal arm secured to the slide, the latch, and device P, for unlocking the tines, substantially as shown.

2. In a horse hay-fork, the combination of the body, the vertically-moving slide which is moved by the tines, an arm secured to the slide, a pivoted latch or lever, and a device against or upon which the latch bears, the latch and the device forming a means for unlocking the tines, as described.

In testimony whereof I affix my signature in presence of two witnesses.

GUILFORD DUDELEY ROWELL.

Witnesses:
JOHN BOTTENSEK,
A. M. SPENCER.